(12) United States Patent
Romain et al.

(10) Patent No.: US 12,480,853 B2
(45) Date of Patent: Nov. 25, 2025

(54) CRUCIBLES FOR THERMOGRAVIMETRIC ANALYSIS (TGA)

(71) Applicant: University of Central Florida Research Foundation, Inc., Orlando, FL (US)

(72) Inventors: Gaume Romain, Orlando, FL (US); Matthew Julian, Merritt Island, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 1068 days.

(21) Appl. No.: 17/488,074

(22) Filed: Sep. 28, 2021

(65) Prior Publication Data

US 2023/0101827 A1    Mar. 30, 2023

(51) Int. Cl.
*G01N 5/04*     (2006.01)
*B01L 3/04*     (2006.01)

(52) U.S. Cl.
CPC ............... *G01N 5/04* (2013.01); *B01L 3/04* (2013.01); *B01L 2300/0832* (2013.01); *B01L 2300/0851* (2013.01)

(58) Field of Classification Search
CPC .. G01N 5/04; G01N 25/00; B01L 3/04; B01L 2300/0832; B01L 2300/0851; C30B 35/002
USPC ........................................................ 422/908
See application file for complete search history.

(56) References Cited

U.S. PATENT DOCUMENTS 5,932,294 A * 8/1999 Colombo .............. F27D 1/1636
                                                              427/469
2009/0038549 A1* 2/2009 Englert ................. C23C 14/243
                                                              118/726

FOREIGN PATENT DOCUMENTS

CN         101006205        *  7/2007
EP         2385156 A1       * 11/2011   ........... C03B 19/095

OTHER PUBLICATIONS

Https://www.csceramic.com/3-4ml-Netzsch-Alumina-Crucibles-for-TGA-Sample-Carrier-GB445213-for-Netzsch-STA-449-F1/F3/F5-Jupiter-Sample-pans-p198.html.
Https://www.csceramic.com/alumina-crucibles-pe-n5200040-n5200045-for-perkinelmer-sta-6000-tga-4000-sample-pans_p319.html.
Https://www.csceramic.com/0-2ml-alumina-crucibles-special-shape-tga-dta-crucibles-gb445172-for-netzsch_p484.html.
Https://www.csceramic.com/0-15ml-crucible-from-graphite-for-netzsch-gb427607_p571.html.
Https://www.csceramic.com/0-3-ml-crucible-from-graphite-for-netzsch-gb399222-dta-sensor1-of-the-dsc-404-f1-f3-pegasus-and-for-tga2-tga-dta3-sensor-of-the-sta-449-f1-f3-f5-jupiter_p572.html.

* cited by examiner

*Primary Examiner* — Jill A Warden
*Assistant Examiner* — Jacqueline Brazin
(74) *Attorney, Agent, or Firm* — Troutman Pepper Locke LLP (57) ABSTRACT

A crucible for a thermogravimetric analysis (TGA) system can include a side wall defining a crucible opening, and a base enclosed by side wall and opposite the crucible opening. The base and side wall form an interior volume configured to hold a material for thermogravimetric analysis. The base can include a base shape configured to prevent a center of mass of the material within the crucible from shifting during thermogravimetric analysis.

19 Claims, 10 Drawing Sheets

CRUCIBLES FOR THERMOGRAVIMETRIC ANALYSIS (TGA)

STATEMENT OF GOVERNMENT RIGHTS

This invention was made with government support under contract no. FA95501810103 awarded by the United States Air Force (USAF) Office of Scientific Research (AFOSR). The government has certain rights in the invention.

FIELD

This disclosure relates to thermogravimetric analysis (TGA).

BACKGROUND

The working principle of dual beam thermogravimetric system is based on cantilever beams. If center of mass of sample moves from starting position during thermal ramp the moment at the fulcrum is changed causing an apparent mass to be added or subtracted from the signal, dependent on which direction the center of mass moves.

Conventional methods and systems have generally been considered satisfactory for their intended purpose. However, there is still a need in the art for improved thermogravimetric systems. The present disclosure provides a solution for this need.

SUMMARY

A crucible for a thermogravimetric analysis (TGA) system can include a side wall defining a crucible opening, and a base enclosed by side wall and opposite the crucible opening. The base and side wall form an interior volume configured to hold a material for thermogravimetric analysis. The base can include a base shape configured to prevent a center of mass of the material within the crucible from shifting during thermogravimetric analysis.

In certain embodiments, the base shape can be or include a centered convex shape to medialize the material within the interior volume. The base shape can have a convex side that forms part of the interior volume. In certain embodiments, the base shape can be completely conical within the side wall. Any other suitable convex (e.g., symmetric shape) is contemplated herein.

In certain embodiments, the base can include a flat underside. Any suitable shape is contemplated herein. In certain embodiments, the base can be solid.

In certain embodiments, the base can be hollow such that the base defines a support wall and an open bottom to reduce mass per unit volume of the crucible. The apex of the conical base shape can be coincident with a base plane defined by a bottom of the support wall. In certain embodiments, the conical base shape can include a half angle of about 60 degrees. Any other suitable angle is contemplated herein.

In certain embodiments, the base can include a holding feature extending from the base toward the crucible opening configured to resist lateral motion of the material within the crucible. In certain embodiments, the holding feature can include a conical shape, for example. In certain embodiments, the holding feature can include a solid cylinder. The holding feature can include a hollow cylinder. Any other suitable shape is contemplated herein.

In certain embodiments, the side wall can be cylindrical. Any other suitable shape for a TGA crucible is contemplated herein.

In certain embodiments, the interior volume can be about 90 microliters. Any other suitable volume for use with a TGA system is contemplated herein.

In certain embodiments, the crucible can be made of aluminum, alumina, platinum, quartz, graphite, or vitreous graphite. Any suitable combination of materials and/or alternate materials is contemplated herein.

In accordance with at least one aspect of this disclosure, a crucible for thermogravimetric analysis including a shape configured to prevent walking of a material within the crucible during thermogravimetric analysis to prevent erroneous apparent mass loss readings. The shape can include a conical shaped base. In certain embodiments, the shape can include a holding feature extending upwardly from the base. The crucible can include any other suitable features of a crucible disclosed herein, e.g., as described above.

In accordance with at least one aspect of this disclosure, a crucible for thermogravimetric analysis can include a side wall defining a crucible opening, and base means configured to prevent walking of a material within the crucible during thermogravimetric analysis to prevent erroneous apparent mass loss readings. The crucible can be made of aluminum, alumina, platinum, quartz, graphite, or vitreous graphite, or any other suitable material or combination of materials. The crucible can include any other suitable features of a crucible disclosed herein, e.g., as described above.

In accordance with at least one aspect of this disclosure, a method can include using a crucible configured to prevent walking of a material within the crucible shape in a thermogravimetric analysis (TGA) system to reduce or eliminate erroneous apparent mass loss readings. Using the crucible can include disposing a powder material for testing within the crucible, heating the powder material, and measuring mass change of the powder or sample as a function of time or temperature. The method can include any other suitable method(s) and/or portions thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
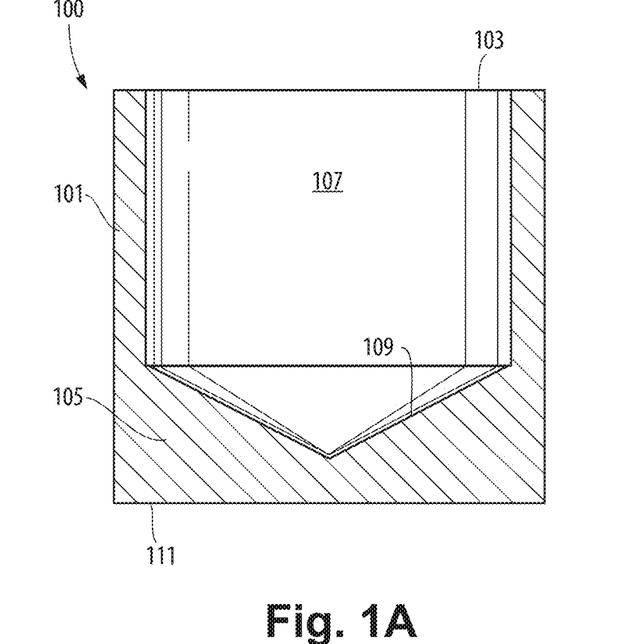
FIG. 1A is a cross-sectional perspective view of an embodiment of a crucible in accordance with this disclosure.

Reference will now be made to the drawings wherein like reference numerals identify similar structural features or aspects of the subject disclosure. For purposes of explanation and illustration, and not limitation, an illustrative view of an embodiment of a crucible in accordance with the disclosure is shown in FIGS. 1A and 1s designated generally by reference character 100. Other embodiments and/or aspects of this disclosure are shown in FIGS. 1B-7C. Certain embodiments described herein can be used in reducing or eliminating erroneous mass loss readings in thermogravimetric analysis.

Figure 1B:
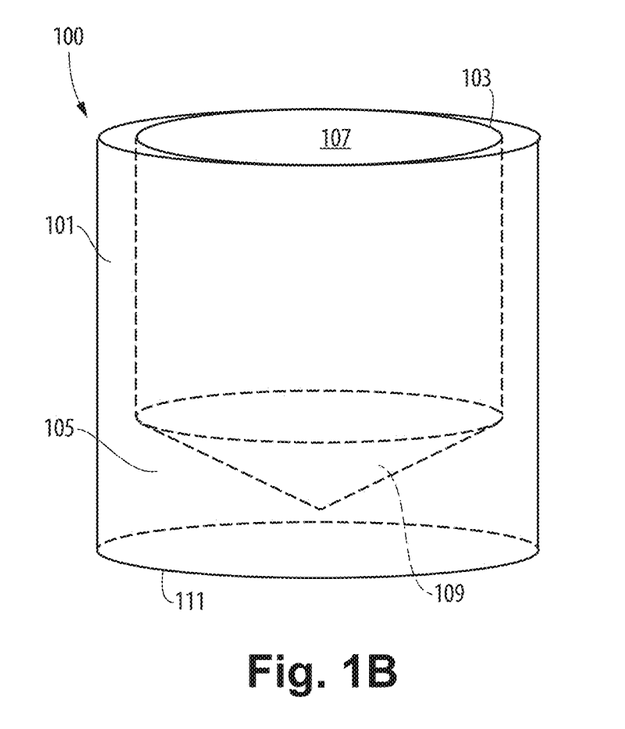
FIG. 1B is a perspective see-through view of the embodiment of FIG. 1A.

Referring to FIGS. 1A and 1B, a crucible 100 for a thermogravimetric analysis (TGA) system (not shown) can include a side wall 101 defining a crucible opening 103, and a base 105 enclosed by side wall 101 and opposite the crucible opening 103. The base 105 and side wall 101 form an interior volume 107 configured to hold a material (e.g., a powder) for thermogravimetric analysis. The base 105 can include a base shape 109 configured to prevent a center of mass of the material within the crucible 100 from shifting during thermogravimetric analysis.

In certain embodiments, the base shape 109 can be or include a centered convex shape to medialize the material within the interior volume 107. For example, the base shape 109 can have a convex side that forms part of the interior volume 107. In certain embodiments, the base shape 109 can be completely conical (e.g., including cones and frustoconical shapes as defined herein) within the side wall 101, e.g., as shown in FIGS. 1A-2B. Any other suitable convex shape (e.g., medializing symmetric shape, pyramidal, etc.) is contemplated herein.

In certain embodiments, as shown in FIGS. 1A and 1B, the base 105 can include a flat underside 111. Any suitable shape is contemplated herein. In certain embodiments, the base 105 can be solid, e.g., as shown in FIGS. 1A and 1B.

Figure 2A:
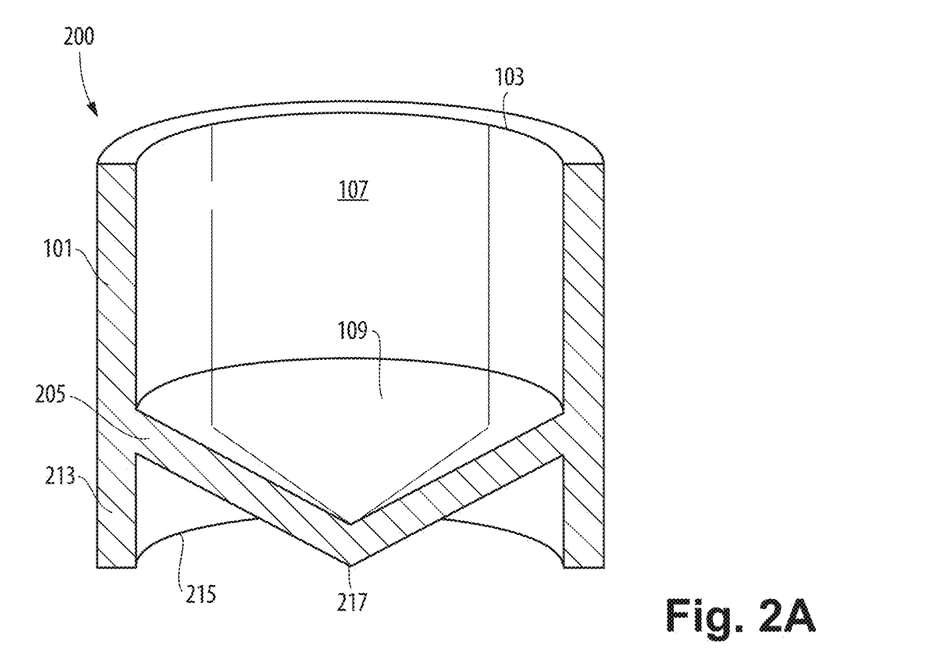
FIG. 2A is a cross-sectional perspective view of an embodiment of a crucible in accordance with this disclosure.
Figure 2B:
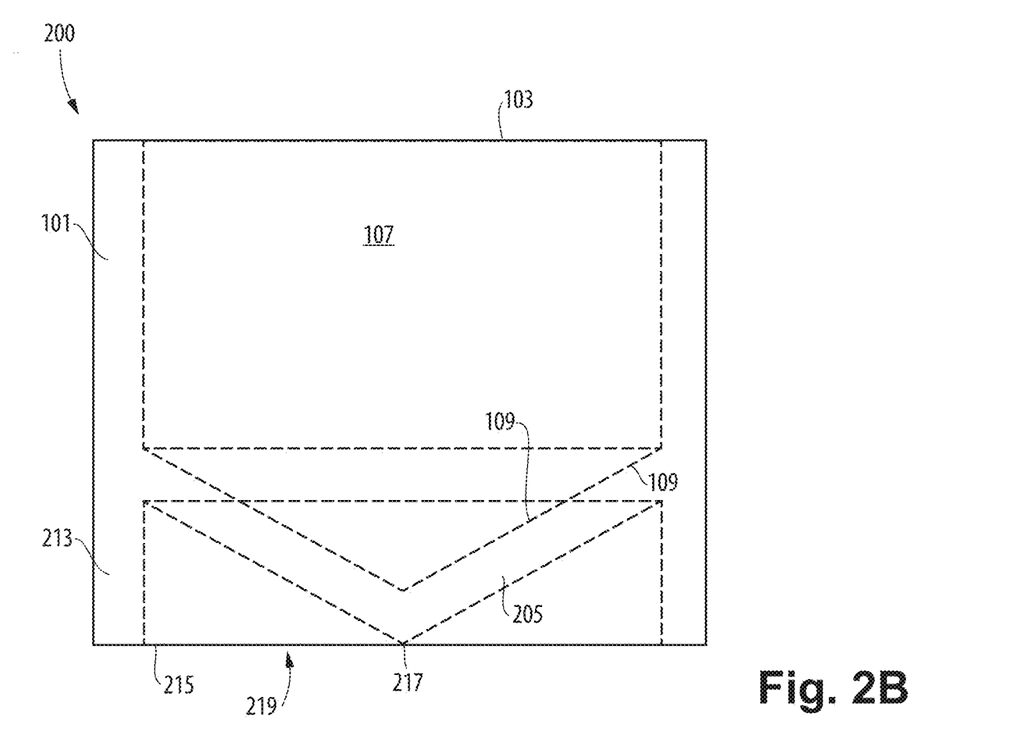
FIG. 2B is a perspective see-through view of the embodiment of FIG. 2A.

Referring additionally to FIGS. 2A and 2B, in certain embodiments, the base 205 can be hollow such that the base 205 defines a support wall 213 and an open bottom 215 to reduce mass per unit volume of the crucible 200. The apex 217 of the conical base shape 109 can be coincident with (and limited to) a base plane 219 defined by a bottom of the support wall 217 (e.g., to not protrude from the bottom). Such an arrangement can minimize the mass of the crucible base with the conical shape, and wall thickness can be minimized to be still functional yet as light as possible.

In certain embodiments, the conical base shape 205 can include a half angle of about 60 degrees. Any other suitable angle (e.g., steeper than about 45 degrees) is contemplated herein. One having ordinary skill in the art in view of this disclosure is enabled to determine acceptable minimum slope steepness for preventing walking of the material in the crucible.

Figure 3A:
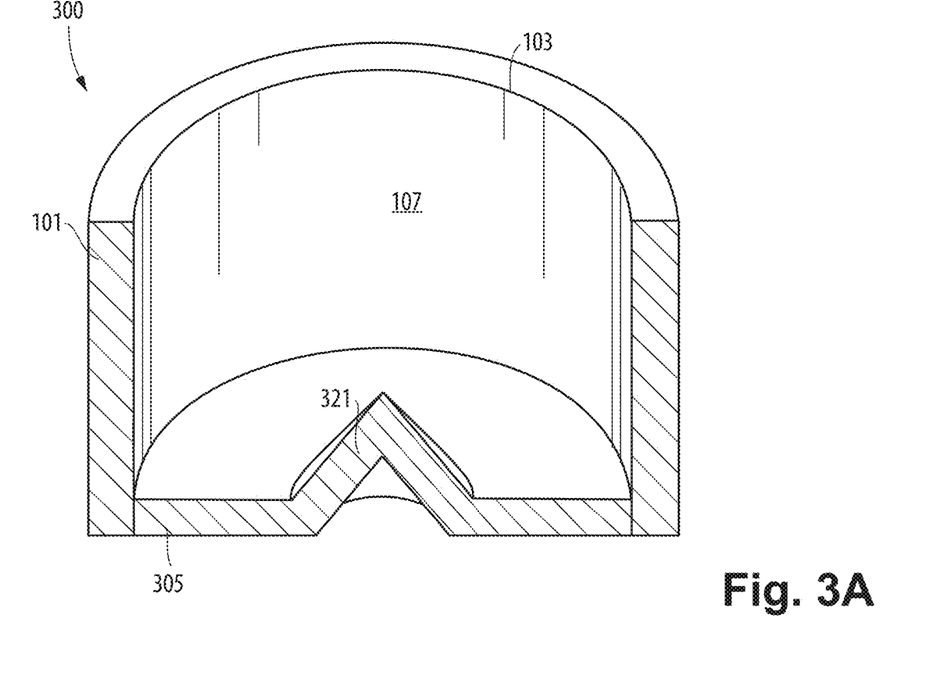
FIG. 3A is a cross-sectional perspective view of an embodiment of a crucible in accordance with this disclosure.
Figure 3B:
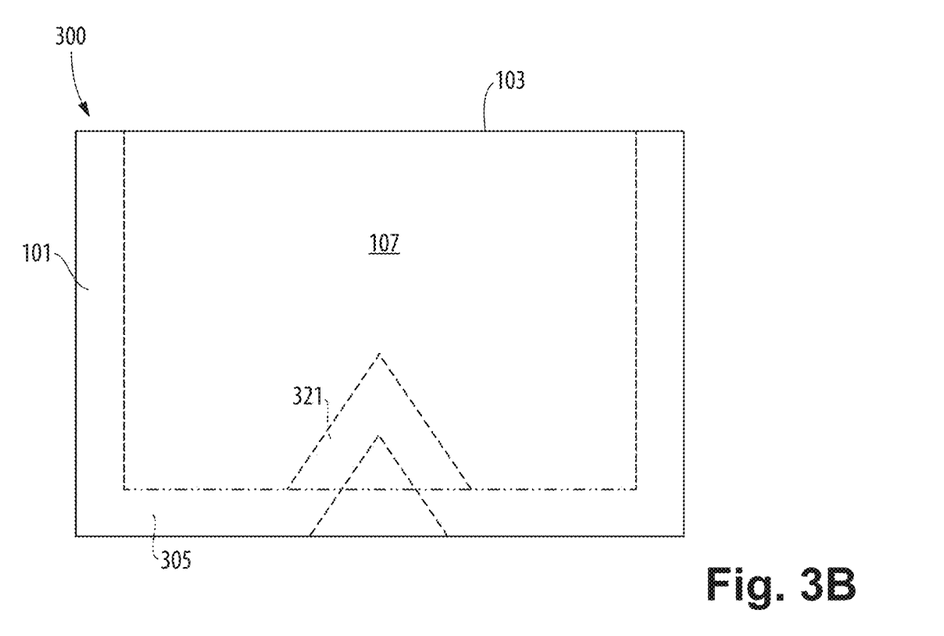
FIG. 3B is a perspective see-through view of the embodiment of FIG. 3A.
Figure 4A:
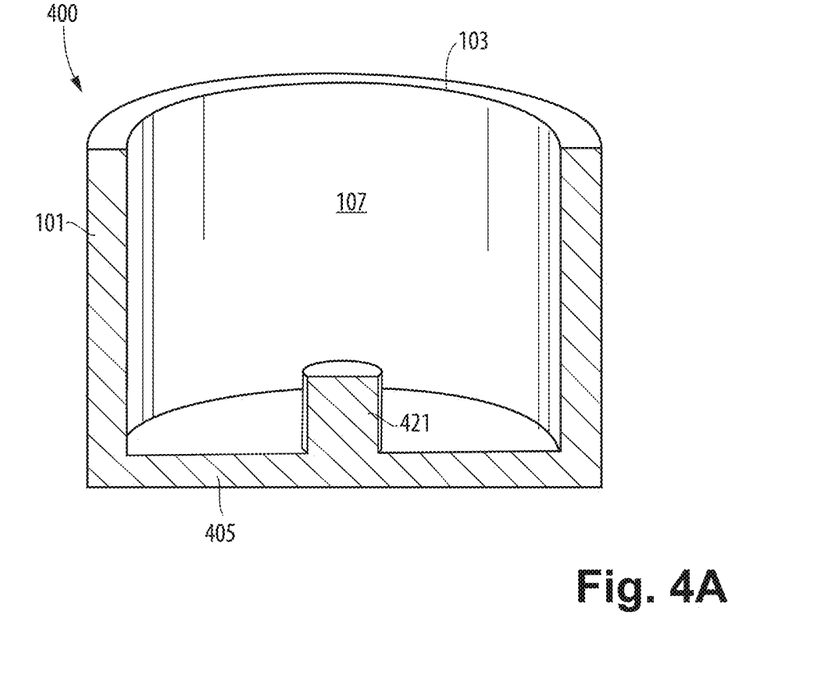
FIG. 4A is a cross-sectional perspective view of an embodiment of a crucible in accordance with this disclosure.
Figure 4B:
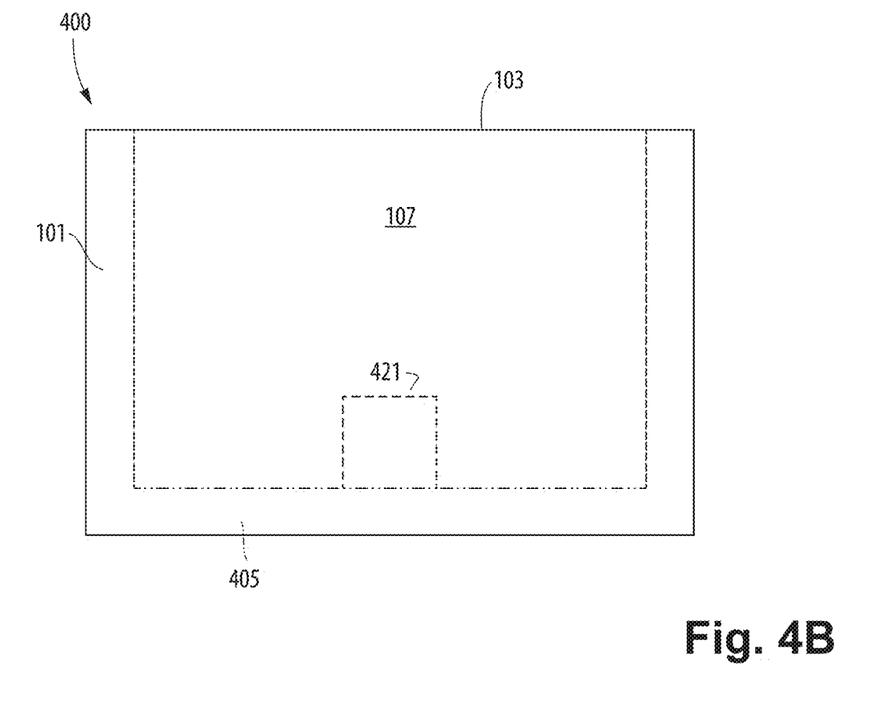
FIG. 4B is a perspective see-through view of the embodiment of FIG. 4A.
Figure 5A:
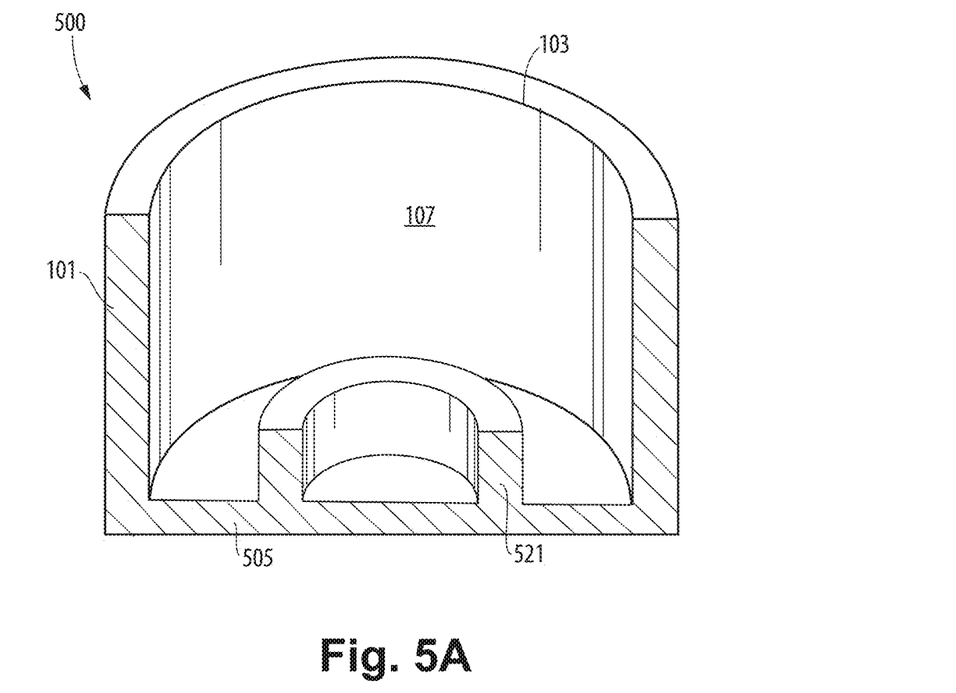
FIG. 5A is a cross-sectional perspective view of an embodiment of a crucible in accordance with this disclosure.
Figure 5B:
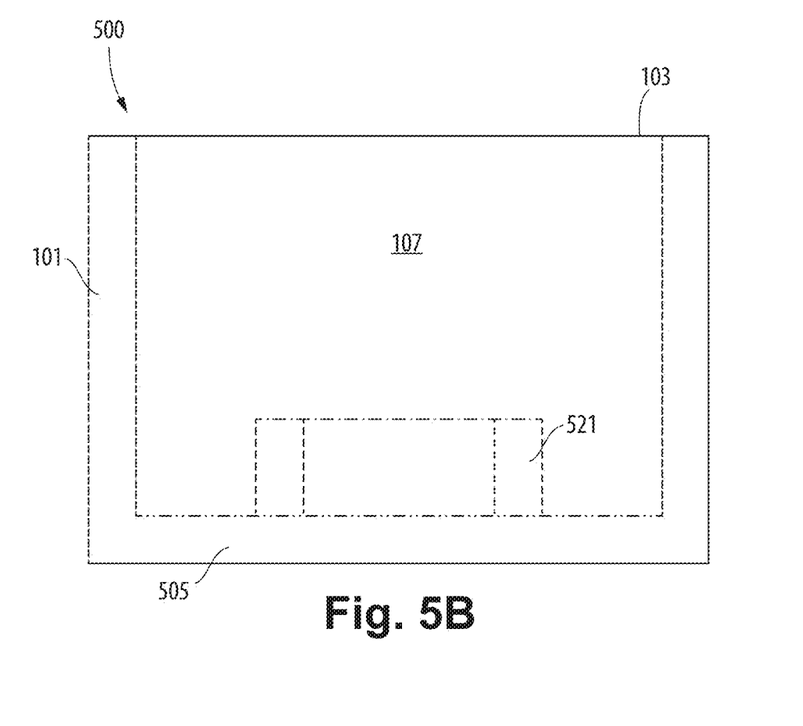
FIG. 5B is a perspective see-through view of the embodiment of FIG. 5A.

Referring additionally to FIGS. 3A-5B, in certain embodiments, the base (e.g., base 305, 405, 505 of crucibles 300, 400, 500, respectively) can include a holding feature 321, 421, 521 extending from the base 305, 405, 505 toward the crucible opening 103. The holding feature 321, 421, 521 can be configured to resist lateral motion of the material within the crucible 300, 400, 500. In certain embodiments, as shown in FIGS. 3A and 3B, the holding feature 321 can include a conical shape (e.g., a hollow convex cone extending toward opening 103), for example. Referring to FIGS. 4A and 4B, in certain embodiments, the holding feature 421 can include a solid cylinder (or any other solid geometric shape). Referring to FIGS. 5A and 5B, the holding feature 521 can include a hollow cylinder (or any other suitable hollow shape). The shapes can be annular for example to provide symmetry in all radial directions. Any other suitable shape (e.g., waffle shaped bottom) is contemplated herein.

In certain embodiments, the side wall 101 can be cylindrical, e.g., as shown in FIGS. 1A-5B. Any other suitable side wall shape for a TGA crucible is contemplated herein.

In certain embodiments, the interior volume 107 can be about 90 microliters. Any other suitable volume for use with a TGA system is contemplated herein.

In certain embodiments, the crucible 100, 200, 300, 400, 500 can be made of alumina, platinum, quartz, graphite, or vitreous graphite. Any suitable combination of materials and/or alternate materials is contemplated herein.

In accordance with at least one aspect of this disclosure, a crucible (e.g., crucible 100, 200, 300, 400, 500) for thermogravimetric analysis including a shape configured to prevent walking of a material within the crucible during thermogravimetric analysis to prevent erroneous apparent mass loss readings. The shape can include a conical shaped base. In certain embodiments, the shape can include a holding feature extending upwardly from the base. The crucible can include any other suitable features of a crucible disclosed herein, e.g., crucible 100, 200, 300, 400, 500 as described above.

In accordance with at least one aspect of this disclosure, a crucible (e.g., crucible 100, 200, 300, 400, 500) for thermogravimetric analysis can include a side wall defining a crucible opening, and base means configured to prevent walking of a material within the crucible during thermogravimetric analysis to prevent erroneous apparent mass loss readings. The crucible can be made of alumina, platinum, quartz, graphite, or vitreous graphite, or any other suitable material or combination of materials. The crucible can include any other suitable features of a crucible (e.g., crucible 100, 200, 300, 400, 500) disclosed herein, e.g., as described above.

In accordance with at least one aspect of this disclosure, a method can include using a crucible configured to prevent walking of a material within the crucible shape in a thermogravimetric analysis (TGA) system to reduce or eliminate erroneous apparent mass loss readings. Using the crucible can include disposing a powder material for testing within the crucible, heating the powder material, and measuring mass change of the powder or sample as a function of time or temperature. The method can include any other suitable method(s) and/or portions thereof.

Traditional crucibles have a flat internal bottom. The flat internal bottom allows the center of mass of the material under test to walk and does not urge the newly shifted center of gravity to move back to center. Embodiments can include a structure that is medializing and does not allow the center of mass to leave the center, or if it somehow does leave, it will be urged back into the center. Embodiments can maximize the inner volume of the crucible relative to the mass of the crucible. Embodiments can be cast, milled, additively manufactured, or formed in any other suitable way.

Figure 6A:
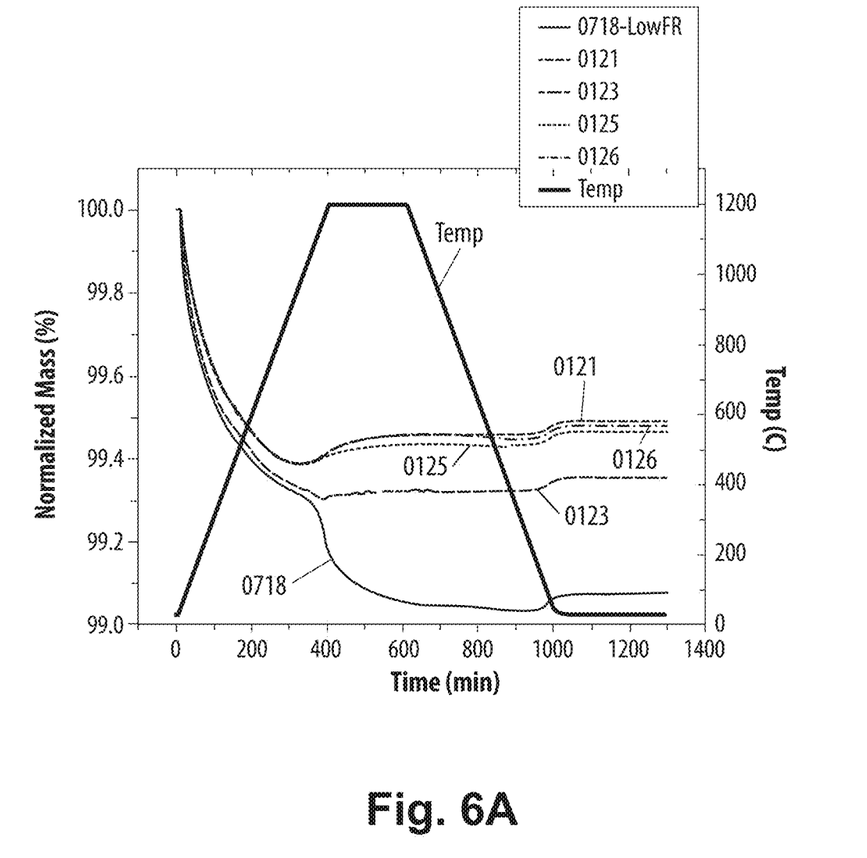
FIGS. 6A, 6B, and 6C shows gravimetric analysis experimental results showing apparent mass loss when shifting center of mass toward and away from a fulcrum of a thermogravimetric analysis system.
Figure 6B:
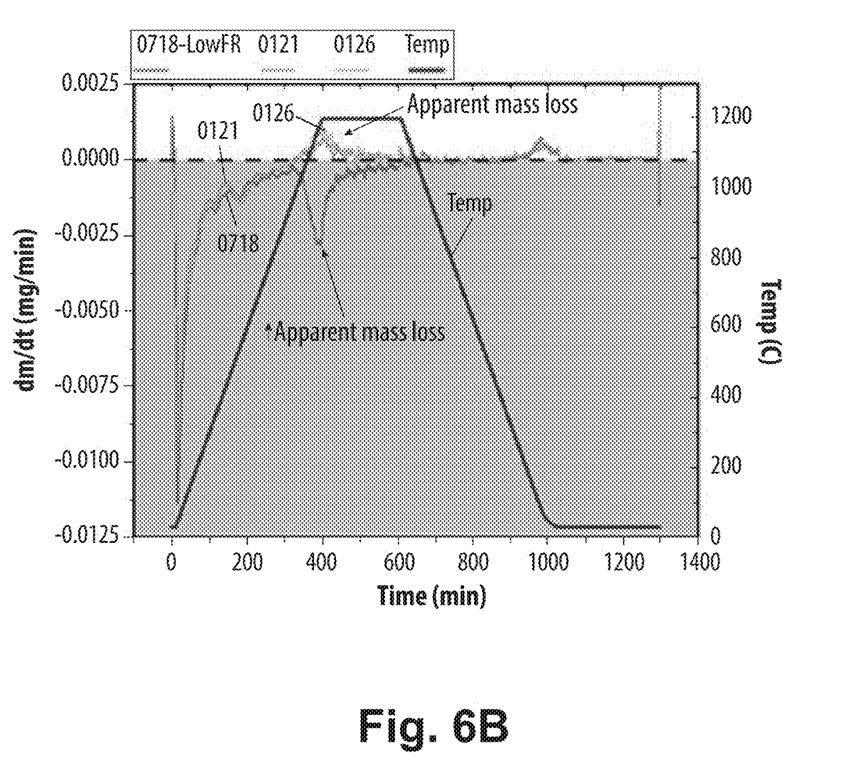
Figure 6C:
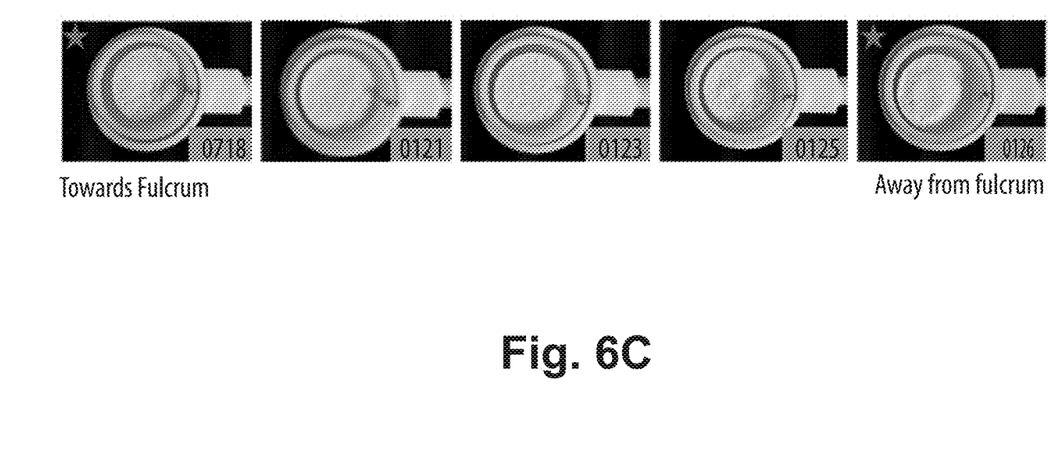

Referring to FIG. 6A, loss of ignition (LOI) signals using standard flat bottom refractory crucibles showing large variability in signals from consecutive TGA runs of same powder lot are shown. FIG. 6B shows a rate of change of mass for several signals. Highlighted peak above zero causes reduction in apparent mass loss. Highlighted peak below zero causes increase in apparent mass loss. FIG. 6C shows placement of sintered samples within crucible immediately after thermal cycling. The appearance of the labels of the samples of FIG. 6C correlate to those shown on data plots. The star on sample 0718 indicates the sintered body has moved towards the fulcrum of the beam, and dm/dt plot shows negative peak and an increase in apparent mass loss in LOI signal. The star on 0126 indicates the sintered body has moved away from the fulcrum of the beam, and dm/dt plot shows positive peak and a decrease in apparent mass loss in LOI signal.

In the rate of change curves, shown in the FIG. 6B, the start of the peaks for the 0718 and 0126 curves indicates the parts sinter and begin to move inside the flat bottom crucible prior to reaching high temperature. They continue to move rapidly thereafter producing large peaks above and below zero which adds/subtracts apparent mass to/from the signal of the mass of volatiles being released from the powder if the center of mass would remain in the center of the crucible, which is the intent of the measurement. The variance between the curves in FIG. 6A shows that when unable to control the movement of this part during the high temperature ramp this leads to the non-repeatability of the loss-on-ignition measurement, rendering the measurement both inaccurate and imprecise.

Figure 7A:
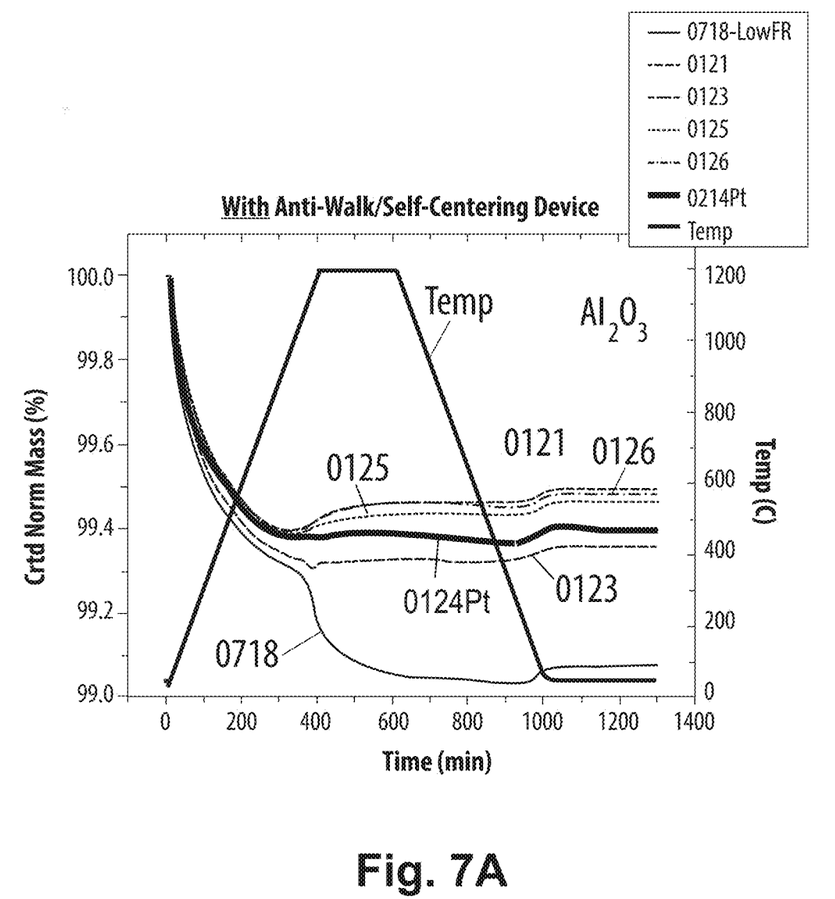
FIGS. 7A and 7B shows gravimetric analysis experimental results utilizing the embodiment of FIG. 1A compared to the results of FIG. 6A-6C, wherein the results show mass change staying at about the zero line.
Figure 7B:
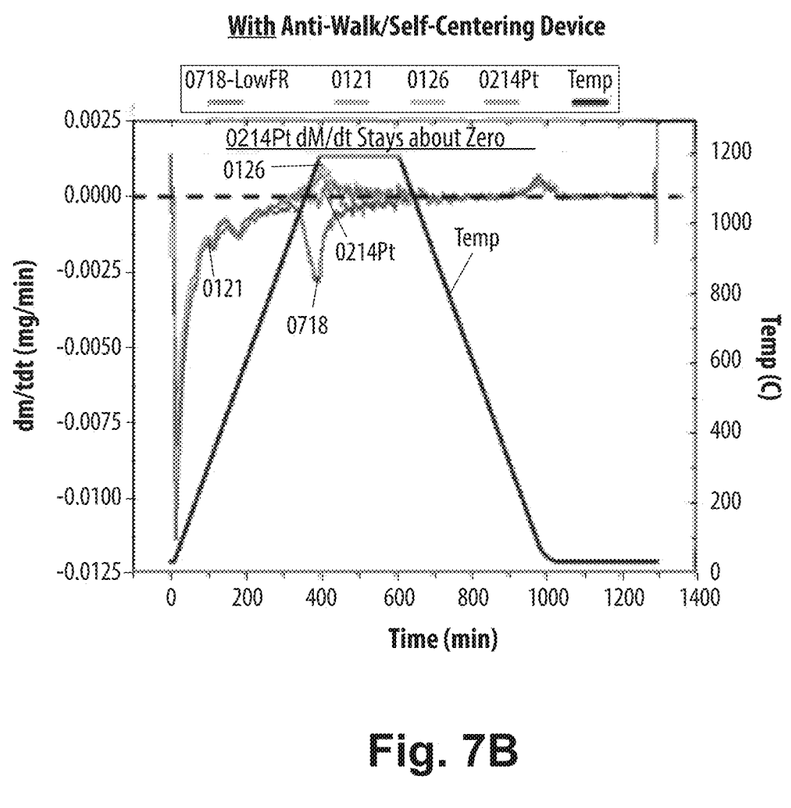

FIG. 7A shows the loss of ignition signals using standard flat bottom refractory crucibles (same as FIG. 6A) compared to the new curve which has the same thermal cycle using embodiments of a crucible disclosed herein having the anti-walk/self-centering device. FIG. 7B shows a rate of change of mass for several signals (same as FIG. 6B) with the new curve added. The data shows that when the embodiment of FIG. 1A is employed the new curve stays about zero (even before and during high temperature) with no major peaks above or below, indicating no added/subtracted apparent mass loss due to sample moving within refractory crucible. This indicates the disclosed embodiments are successful in maintaining the location of the center of mass while the powder sinters throughout the thermal cycle. Thus, embodiments ensure both accuracy and precision of the high temperature loss-on-ignition measurement when analyzing powders that sinter during the thermal cycle.

Embodiments can be used with TGA horizontal beam systems, e.g., both single and dual beam. Any other suitable application and/or system type is contemplated herein. Embodiments provide improved designs of refractory crucibles for improved signal stability, precision and accuracy when using commercial dual-beam thermogravimetric analysis (TGA) systems.

Thermogravimetric analysis (TGA) includes monitoring the mass of a sample undergoing thermal decomposition. These measurements are carried out in dedicated systems comprised of a balance surrounded by a programmable heater, where the mass of a sample is measured against that of a thermally-stable standard in a dual-beam balance configuration (most common configuration). Various applications (e.g. glass, ceramic or polymer processing) require precise and accurate TGA measurements in order to account for high temperature modifications of materials, such as dehydration, decarboxylation or volatilization. When performing at high temperatures (~⅔ melting point of materials), TGA measurements can exhibit uncontrolled variability on the order of a percent due to the motion of the sample in its crucible. This motion, caused by thermal decomposition or inhomogeneous sintering, displaces the center of mass of the sample with respect to the reference and destabilizes the balance during the measurement. This disclosure proposes various designs of self-centering TGA crucibles to allow for samples to stay put at a constant location during these measurements.

Compared to currently available technology, embodiments offer better accuracy in thermogravimetric analyses, especially in the quality control of fine powders (nanopowders) and polymers. Precise measurement of so-called "loss-on-ignition" on powders or samples that sinter or decompose at high temperatures. The current high temperature refractory crucibles on the market are flat bottom cups. When powders or samples decompose or sinter during TGA, the center of mass of the powder can move around inside the cup and affects the equilibrium of the balance. Embodiments include new designs for TGA cups that minimize the movement of the powder during decomposition or sintering, thereby maintaining the location of the center of mass of the test sample during the TGA run. TGA can be used in manufacturing and scientific labs as an analytical and quality control method.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A crucible for a thermogravimetric analysis (TGA) system, comprising:
   a side wall defining a crucible opening; and
   a base enclosed by the side wall and opposite the crucible opening, the base and side wall defining a cylindrical interior volume configured to hold a material for thermogravimetric analysis, wherein the base includes a base shape configured to prevent a center of mass of the material within the crucible from shifting during thermogravimetric analysis, wherein the base shape is or includes a convex shape centered relative to the interior volume to medialize the material within the interior volume, wherein the base shape has a convex side that forms part of the interior volume.

2. The crucible of claim 1, wherein the base shape is completely conical within the side wall.

3. The crucible of claim 2, wherein the base includes a flat underside.

4. The crucible of claim 3, wherein the base is solid.

5. A crucible for a thermogravimetric analysis (TGA) system, comprising:
   a side wall defining a crucible opening; and
   a base enclosed by the side wall and opposite the crucible opening, the base and side wall forming an interior volume configured to hold a material for thermogravimetric analysis, wherein the base includes a base shape configured to prevent a center of mass of the material within the crucible from shifting during thermogravimetric analysis, wherein the base shape is or includes a convex shape to medialize the material within the interior volume, wherein the base shape has a convex side that forms part of the interior volume, wherein the base shape is completely conical within the side wall, wherein the base is hollow such that the base defines a support wall and an open bottom to reduce mass per unit volume of the crucible.

6. The crucible of claim 5, wherein the conical base shape has an apex, wherein the apex of the conical base shape is coincident with a base plane defined by a bottom of the support wall.

7. The crucible of claim 2, wherein the conical base shape includes a half angle of about 60 degrees.

8. The crucible of claim 1, wherein the base includes a holding feature extending upwardly from a planar surface of the base toward the crucible opening configured to resist lateral motion of the material within the crucible.

9. The crucible of claim 8, wherein the holding feature includes a conical shape.

10. A crucible for a thermogravimetric analysis (TGA) system, comprising:
    a side wall defining a crucible opening; and
    a base enclosed by the side wall and opposite the crucible opening, the base and side wall forming an interior volume configured to hold a material for thermogravimetric analysis, wherein the base includes a base shape configured to prevent a center of mass of the material within the crucible from shifting during thermogravimetric analysis, wherein the base includes a holding feature extending from the base toward the crucible opening configured to resist lateral motion of the material within the crucible, wherein the holding feature includes a solid cylinder.

11. A crucible for a thermogravimetric analysis (TGA) system, comprising:
    a side wall defining a crucible opening; and
    a base enclosed by the side wall and opposite the crucible opening, the base and side wall forming an interior volume configured to hold a material for thermogravimetric analysis, wherein the base includes a base shape configured to prevent a center of mass of the material within the crucible from shifting during thermogravimetric analysis, wherein the base includes a holding feature extending from the base toward the crucible opening configured to resist lateral motion of the material within the crucible, wherein the holding feature includes a hollow cylinder.

12. The crucible of claim 1, wherein the side wall is cylindrical.

13. The crucible of claim 1, wherein the interior volume is about 90 microliters.

14. The crucible of claim 1, wherein the crucible is made of aluminum, alumina, platinum, quartz, graphite, or vitreous graphite.

15. A crucible for thermogravimetric analysis including a shape configured to prevent walking of a material within the crucible during thermogravimetric analysis (TGA) to prevent erroneous apparent mass loss readings, the shape defining a cylindrical interior volume, with a base shape that is or includes a convex shape centered relative to the interior volume to medialize the material within the interior volume, wherein the base shape has a convex side that forms part of the interior volume.

16. The crucible of claim 15, wherein the base shape includes a conical shaped base.

17. The crucible of claim 15, wherein the base shape includes a holding feature extending upwardly from a planar surface of the base shape toward a crucible opening.

18. A method, comprising:
    using a crucible configured to prevent walking of a material within the crucible in a thermogravimetric analysis (TGA) system to reduce or eliminate erroneous apparent mass loss readings, wherein the crucible has a shape defining a cylindrical interior volume, with a base shape that is or includes a convex shape centered relative to the interior volume to medialize the material within the interior volume, wherein the base shape has a convex side that forms part of the interior volume.

19. The method of claim 18, wherein using the crucible includes disposing a powder material for testing within the crucible, heating the powder material, and measuring mass change of the powder or sample as a function of time or temperature.

* * * * *